United States Patent
Lange et al.

(10) Patent No.: US 8,115,631 B2
(45) Date of Patent: Feb. 14, 2012

(54) DETERMINING ENDPOINT CONNECTIVITY OF CABLING INTERCONNECTS

(75) Inventors: Andrew Snowden Lange, Culver City, CA (US); Scott William Nelson, Paris (FR)

(73) Assignee: Alcatel Lucent, Paris (FR)

( * ) Notice: Subject to any disclaimer, the term of this patent is extended or adjusted under 35 U.S.C. 154(b) by 957 days.

(21) Appl. No.: 12/112,894

(22) Filed: Apr. 30, 2008

(65) Prior Publication Data

US 2009/0322487 A1 Dec. 31, 2009

(51) Int. Cl.
*G08B 13/14* (2006.01)
*H04Q 5/22* (2006.01)

(52) U.S. Cl. .......... 340/572.1; 340/10.1; 340/10.52

(58) Field of Classification Search .......... 340/8.1, 340/825.49, 10.1, 10.52, 10.6, 687, 572.1; 439/491; 726/4; 707/104
See application file for complete search history.

(56) References Cited

U.S. PATENT DOCUMENTS

| | | | | |
|---|---|---|---|---|
| 5,162,792 | A * | 11/1992 | Morris | 340/2.1 |
| 6,968,994 | B1 * | 11/2005 | Ashwood Smith | 235/375 |
| 7,193,422 | B2 * | 3/2007 | Velleca et al. | 324/538 |
| 7,342,499 | B2 | 3/2008 | Chiu et al. | |
| 7,348,885 | B2 | 3/2008 | Chiu | |
| 7,468,669 | B1 * | 12/2008 | Beck et al. | 340/572.1 |
| 7,696,879 | B2 * | 4/2010 | Lange et al. | 340/572.1 |
| 7,757,936 | B2 * | 7/2010 | Aguren et al. | 235/375 |
| 7,853,832 | B2 * | 12/2010 | Lange et al. | 714/45 |
| 2003/0117962 | A1 * | 6/2003 | Mattson et al. | 370/250 |
| 2005/0215119 | A1 * | 9/2005 | Kaneko | 439/607 |
| 2006/0148279 | A1 * | 7/2006 | German et al. | 439/49 |
| 2007/0247284 | A1 * | 10/2007 | Martin et al. | 340/10.1 |

* cited by examiner

*Primary Examiner* — Daniel Wu
*Assistant Examiner* — Mohamed Barakat
(74) *Attorney, Agent, or Firm* — Kramer & Amado P.C.

(57) ABSTRACT

In a communication network or system, cables that interconnect systems or subsystems are provided with RFID tags embedded or affixed at least at one endpoint of each cable. An installed or portable RFID reader in the proximity of an RFID tag of a given cable enables a unique cable endpoint identifier contained in the RFID tag to be read. The identifier is combined with a unique port identifier of the port to which the cable endpoint is attached at the message is sent to a far-end system or subsystem connected to the other end of the cable. That system reads the message and the information contained therein along with a unique port identifier of its own port connected to the given cable, enables positive confirmation of the communicative connection between the two ports and also the cable providing the connection. It also enables communication of the physical routing information to an operations support system for cable management.

29 Claims, 3 Drawing Sheets

DETERMINING ENDPOINT CONNECTIVITY OF CABLING INTERCONNECTS

FIELD OF THE INVENTION

The invention is directed to communication networks, in particular to methods and apparatus for determining the connection of cable endpoints to input/output (I/O) ports of communications systems interconnected by communications cables, such connection also referred to hereinafter as cable endpoint connectivity.

BACKGROUND OF THE INVENTION

Evolution of network technologies resulted in a world of interconnected networks where businesses and households are now amazingly close to eachother. The notion of "network" turns out to be central to our times: the Internet, LANs, WANs, enterprise networks, home networks, etc. are today interconnected over the World Wide Web, changing our lives and the way we do business. This evolution presents significant challenges to service and network providers, which attempt to serve their clients faster and better, by continuously enlarging and upgrading their networks with a view to serve a growing number of clients and to implement the latest advances in networking technologies.

Typically, the equipment is situated in an environmentally hardened enclosure, such as a cabinet, or in a central office (CO) or a point-of-presence office which is generally environmentally controlled. Because the cost of space in these environments is high, the equipment is commonly organized in the most compact manner that is practical. As a result, there is often a confusing collection of cabling running through the environment to interconnect the equipment within the respective location (office, cabinet, etc) both to other equipment within the location and to equipment outside of the location.

Network deployment and upgrading presents complex challenges to providers, one of which is managing interconnections between equipment of various size, make and functionality (also referred to here as systems) that make-up the network. To use an example provided on the HP website at http://www.hpl.hp.com/research/about/asset_tracking.html: "a single rack of servers might have 2,000 identical optical cables running into and out of it; it can take two people three days to connect just 500 of them." Therefore, it is important that specific cables are connected to specific places on the equipment.

Thus, techniques to ascertain the existing physical cabling connections between various systems within a certain location (e.g. a Central Office) are needed. For example, it may be necessary to make such a determination if modifications to cabling were to be carried out, or if other modifications were to be made that could put the cabling at risk. Preferably, these techniques would not involve disconnecting the cables, especially in the case of communications networks since such an action would affect services being carried over those cables. Furthermore, these techniques would also apply to cabling connections of electronic systems in general, in situations where there are numerous systems to be interconnected at a particular installation site and there are a very large number of electrical or optical cables interconnecting them, such that there exists a very real possibility of incorrect connections and wherein determining the exact nature of the interconnection errors would be a very onerous and time consuming task. In addition, these techniques should be equally applicable to cables made of optical fiber or copper.

It is known to attach identifying tags to cabling; this may be as simple as attaching a paper tag with a tie-wrap or writing on a piece of tape that is adhered to the cable. However, physical tags may become separated from the cables and the labels may be rendered illegible. Further, locating a particular tag amongst a great many tagged cables in a crowded environment may be difficult.

It is also known to use unique connectors. The connectors may be affixed to multiple cables and have a geometry that allows insertion into only one type of device in one particular way. However, the connectors must be connected to the cables in the proper way. Further, designing and manufacturing unique connectors for a very large number of cables is difficult and relatively costly because each can only serve a particular function and production runs tend to be in relatively small numbers.

Radio Frequency Identification (RFID or RF-ID) technology, although nascent, is known for improving supply chain efficiency by facilitating tracking of goods. For example, RFID may displace the bar codes currently used to identify products. An RFID tag is a small, inexpensive circuitry chip which stores data such as a product's expiration date and Electronic Product Code (EPC). The circuitry is responsive to a particular RF signal transmitted by a reader to generate a corresponding signal including the stored data. The range of the corresponding signal is dependent on various factors, but may be effective up to ten meters.

For example, Hewlett Packard and Connectivity Technologies offer solutions in this area, particularly using RFID tags at the ends of cables and RFID readers at the connection ports of systems to read the tags to identify the endpoint of cables that are connected to the ports. The cable identification information is then sent to an Operation Support System (OSS) or Network Management System (NMS) that uses the information to determine the interconnection of the systems, which is made available to an operator, e.g. as a network map. However, not only does this solution require an OSS or NMS capable of receiving and processing the interconnection information, it also requires that all systems participating in this solution have RFID readers at their port connectors. Retrofitting or replacing the I/O cards of legacy systems to include the required RFID readers may not be practical or cost-effective in some cases.

Therefore, it would be desirable to have a solution for determining the cabling interconnection of systems that at least does not require an RFID reader at both endpoints of a cable interconnecting two systems.

SUMMARY OF THE INVENTION

It is an object of the present invention to provide a solution for determining cable endpoint connectivity of cables interconnecting systems of a communications network.

According to an aspect of the invention there is provided an apparatus for determining cable endpoint connectivity of cables interconnecting systems of a communications network. The apparatus includes a near-end system operable to receive a cable identifier of the communications cable and to create and send a near-end message to a far-end system over the cable. The cable identifier includes a unique cable label for the communications cable. The near-end message contains the unique cable label and a unique I/O port identifier for a first I/O port of the near-end system to which the communications cable is connected. The apparatus also includes a far-end system operable to read the information contained in the near-end message, which is received at a second I/O port of the far-end system. The second I/O port is connected to the communications cable. Using the information, the far-end system is operable to associate the first and second I/O ports with the unique cable label, thereby determining endpoint connectivity of the communications cable.

Some embodiments of the invention include a RFID reader for reading the cable identifier stored in an RFID tag disposed at an end of the communications cable connected to the first I/O port. The RFID reader is part of the near-end system in some embodiments, while in others it is a portable RFID reader communicatively coupled to the near-end system for providing the cable identifier thereto. These embodiments provide an advantage of ease and efficiency in determining the cable identifier through the use of RFID technology.

Additionally, in some embodiments the far-end system is further operable to create and send a far-end update message to a management entity, wherein the far-end update message includes the Information of the near-end message and a unique I/O port identifier for the second I/O port. Optionally, the far-end update message could also include additional information such as time-of-day, date, and location of the far-end system. These embodiments advantageously provide integration with a management entity such as an operation support system for tracking and troubleshooting cabling interconnections between systems.

Furthermore, in some embodiments the far-end system is further operable to send a connection query message to the near end system; and the near-end system is further operable to receive the connection query message and to respond thereto by creating and sending the near-end message to the far-end system. These embodiments have the advantage of providing the capability to determine endpoint connectivity of a communication cable locally from the far-end system, for example by a craft person, when the far-end system or the end of the communications cable connected thereto is not equipped with RFID technology.

According to another aspect of the invention there is provided a method of determining endpoint connectivity of a communications cable interconnecting a near-end system and a far-end system via a first I/O port of the near-end system and a second I/O port of the far-end. The method comprises the steps of: creating a near-end message containing information that includes a cable identifier and a first I/O port identifier for the first I/O port, the cable identifier including a unique cable label for the communications cable; sending, from the first I/O port, the near-end message to the far-end system over the communications cable; receiving the near-end message at the second I/O port; and associating a second I/O port identifier for the second I/O port with the first I/O port identifier and the unique cable label, thereby determining endpoint connectivity of the communications cable interconnecting the near-end and far-end systems.

Advantageously, embodiments of the invention could be used by network and service providers to troubleshoot cabling interconnection problems of communications equipment, both electrical and optical interconnections, as well as other types of electronic systems in general. Important reductions in the time needed to troubleshoot cablings errors may be obtained by addressing the problem of easily and accurately determining the endpoint connectivity of cables interconnecting systems or subsystems of a communications network.

BRIEF DESCRIPTION OF THE DRAWINGS

The foregoing and other objects, features and advantages of the invention will be apparent from the following more particular description of the preferred embodiments, as illustrated in the appended drawings, where.

In the figures like features are denoted by like reference characters.

DETAILED DESCRIPTION

Figure 1:
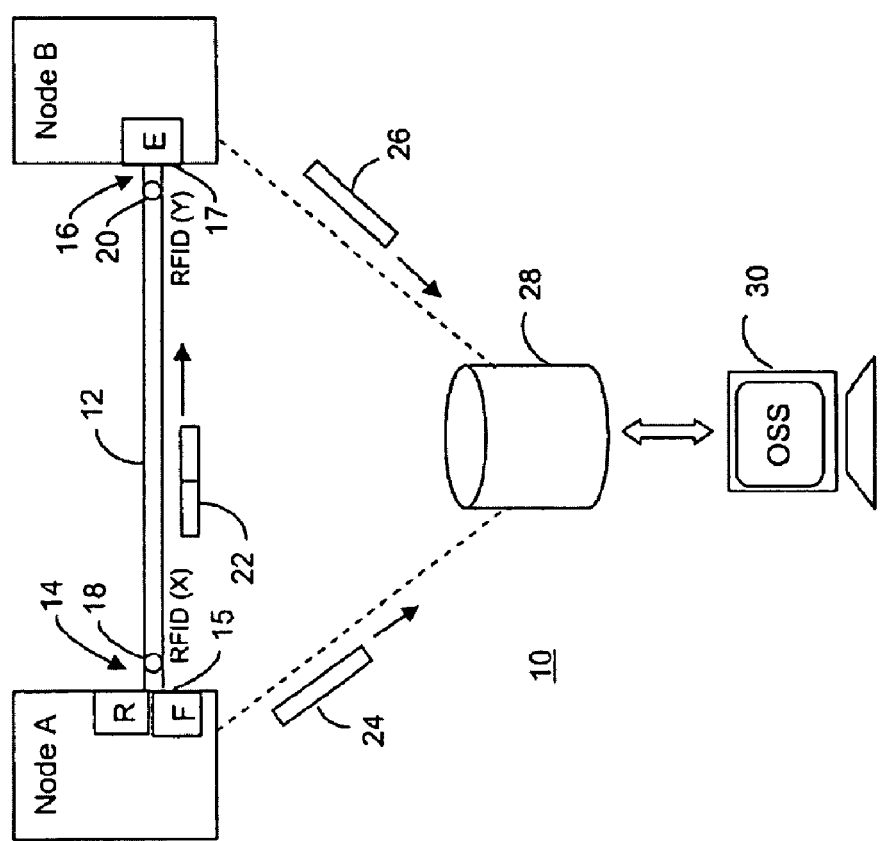
FIG. 1 illustrates an apparatus for determining cable endpoint connectivity of cables interconnecting systems of a communications network according to a first embodiment of the invention.

Referring to FIG. 1, a system 10 for determining the cable endpoint connectivity of cables interconnecting systems of a communications network is depicted. In the figure, a cable 12 interconnects two such systems referred to herein as node A and node B, which are also referred to as near-end system and far-end system, respectively. The specific nature of the cable is immaterial to the operation of the invention, in that it could be an electrical, optical, or some other type of cable, as long as it is capable of communicatively coupling the two nodes A and B. The cable 12 has first and second endpoints 14, 16, each of which is connected to respective first and second I/O ports 15, 17 of the nodes A, B. An RFID tag 18, 20 is disposed at each endpoint 14, 16 of the cable 12. RFID tag 18 includes a first cable identifier X that uniquely identifies the first endpoint 14 and RFID tag 20 includes a second cable identifier Y that uniquely identifies the second endpoint 16. The cable identifiers X and Y uniquely identify their respective endpoints by including a unique cable label and a unique endpoint label. An RFID reader R is disposed at Node A for reading the first cable identifier X of RFID tag 18.

A formatter F is included at the near-end system for receiving the first cable identifier X, from the RFID reader R, and creating a near-end message 22 for transmission to the far-end system over the cable 12. The message 22 includes a cable endpoint identifier, which in this case is the first cable identifier X, a near-end system identifier, for node A, and a near-end system I/O port identifier of the first I/O port 15 to which the cable 12 is connected. This near-end message 22 would typically be carried as payload in a packet of a type normally communicated by the near-end and far-end systems over the cable 12, for example via in-band signaling as an Operation Administration and Maintenance (OAM) type packet. Alternatively, the near-end message 22 could be communicated via out-of-band signaling, via an OAM or other type of signaling channel carried on the cable 12. In any case, the far-end system includes an extractor E for receiving the near-end message 22 and extracting the cable endpoint, I/O port, and near-end system identifiers.

The near-end system, node A, also formulates and sends a near-end update message 24 to a repository 28, which may be part of a network management system, for access by an operation support system (OSS) 30. The formulation of the near-end update message 24 is done by the formatter F. The near-end update message 24 includes information contained in the near-end message 22 and may optionally include additional information such as time of day or geographical positioning information of the near-end system. The former additional information could be useful to track cabling configuration changes and the latter to locate the near-end system to premises of the communications network operator. The near-end update message 24 is sent to the repository 28, or directly to the OSS 30, in the same manner as other messages or information generally used for OAM type functions would normally be sent. The OSS 30, network management system and other like systems are also referred to herein as management entities.

The far-end system, node B, formulates and sends a far-end update message 26 to the repository 28, or directly to the OSS 30. Formulation of the far-end update message 26 is done by the extractor E, while transmission of the far-end update message 26 to the repository 28 or OSS 30 is done in the same manner as transmission of the near-end update message 24 to the repository 28 or OSS 30. The far-end update message 26 includes information contained in the near-end message 22 as well as a far-end system identifier, for node B, and a far-end system I/O port identifier of the I/O port 17 to which the cable 12 is connected. As with the near-end update message 24, the far-end update message may optionally contain additional information such as time and date, and an indication of the geographical positioning of the far-end system.

Using the information contained in the far-end update message 26 alone, the OSS 30 can determine the cable endpoint connectivity of the subject cable 12 interconnecting the near-end and far-end systems. For example, the far-end message 26 contains the first cable identifier X, the near-end system I/O port identifier for the first I/O port 15, the near-end system identifier, for node A, the far-end system I/O port identifier for the second I/O port 17 and a far-end system identifier, for node B. Although the second cable identifier Y is missing from this information, that identifier can be deduced by the OSS 30 in cases where the cable only has two ends, or in the case of a one-to-many connection cable (e.g. a Y-cable) and the other endpoint identifiers are known. Therefore, recalling that the first and second cable identifiers X and Y include unique cable and endpoint labels, straight forward use of this information and that contained in the far-end message 26 allows the OSS 30 to determine that cable 12 has its first endpoint 14 connected to the first I/O port 15 of the near-end system node A and its second endpoint 16 connected to the second I/O port 17 of the far-end system node B. This connection determination could be displayed by the OSS 30 or a NMS system on a network map for use by an operator. Alternatively, this connection information could be used locally at the far-end system, for example by a craft person troubleshooting the connectivity of the near-end and far-end systems.

Numerous modifications, variations and adaptations may be made to the embodiment of the invention described above without departing from the scope of the invention, which is defined in the claims. For example, the cable identifying information could be contained in only one RFID tag located at one end of the cable, e.g. at the connector. Since the second cable identifier Y was not used in the described embodiment, this alteration would operate in the same manner as the described embodiment. As an alternative to the RFID reader R being included in the near-end system, a portable RFID reader could be used to read the information of the RFID tag 18, and that information could be manually or electronically entered in the near-end system. In the latter case electronic entry of the information could be via a craft interface port of the system to which port the portable RFID reader could be connected as required. Furthermore, the I/O port may also include an RFID tag which would be read at the same time to identify the connected port. While the approach of using a portable RFID reader has the advantage of not requiring any systems hardware modifications (e.g. installing RFID readers at system I/O ports) it has a disadvantage of not automatically providing updates to changes in cable interconnections.

A further enhancement would be to provide means in the formatter F of the near-end system for selective transmission of the near-end message 22 on a periodic, automatic or manual basis. The periodic mode would be useful for tracking the physical connectivity between systems of a communications network while the automatic mode could be useful for responding to any changes in said connectivity. It should be noted that having the near-end and far-end updates messages sent to the OSS 30 is not essential in that the OSS 30 or network management system could request the information contained in those messages from the those systems in some other format or sequence. For example the information of such messages could be requested singularly or in bulk, the latter being with respect to multiple ports and cables, or over multiple time periods, or both. Further, it should be noted that the OSS 30 or network management system is not essential to the operation of the invention, which point will be more clearly explained with respect to the second embodiment of the invention.

Figure 2:
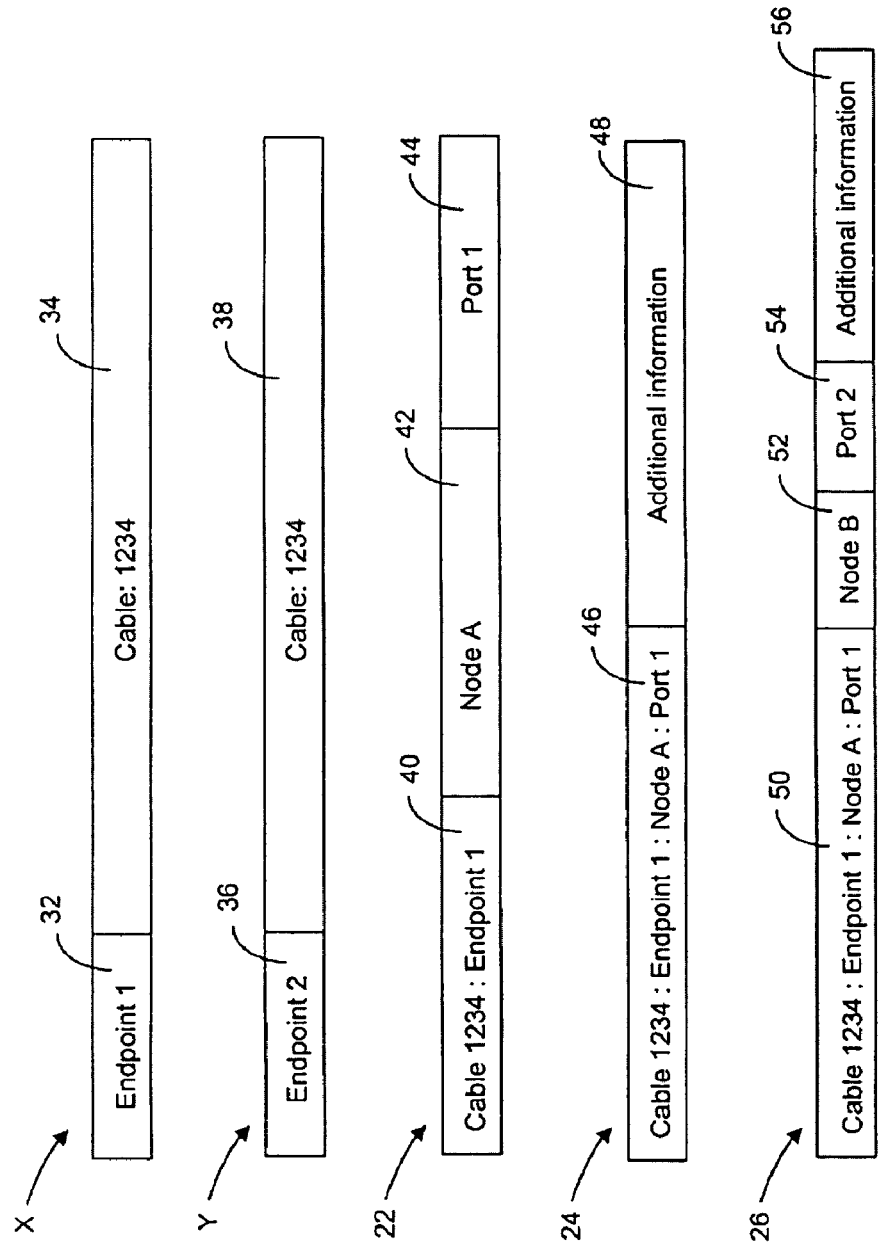
FIG. 2 depicts the format and content of the messages and identifiers of the first embodiment.

With reference to FIG. 2, the format and content of the messages and identifiers of the first embodiment will now be described in more detail. As shown in the figure, the first cable identifier X includes a first field 32 containing the unique endpoint label, Endpoint 1, and a second field 34 containing the unique cable label, Cable 1234. The endpoint label is unique to the cable and the cable label is unique to the network, or in the case where the cable connects subsystems of the same system, the latter may be unique to only that system. To avoid any confusion, preferably the cable label is unique to the premises of the network operator at which the near-end and far-end systems are installed. Likewise, the second cable identifier Y includes a first field 36 containing the unique endpoint label, Endpoint 2, and a second field 38 containing the unique cable label, Cable 1234.

Further with reference to FIG. 2, the near-end message 22 includes the cable endpoint identifier 40, which in this case is the first cable identifier X, a near-end system identifier 42, which in this case is Node A, and a near-end system I/O port identifier 44, which in this case is for the first I/O port 15 having an identifier of port 1. The near-end update message 24 includes a first field 46 containing the information of the near-end message 22 and optionally a second field 48 containing additional information such as time and date at which the message 24 was created or the physical location of the near-end system, or both. The far-end update message 26 includes a field 50 containing information in the near-end message 22 plus a far-end system identifier 52, which in this case is Node B, a far-end system I/O port identifier 54, which in this case is for the second I/O port 17 having an identifier of port 2, and optionally a final field 56 containing additional information as in that of the near-end update message 24.

Variations and alternatives to the format and content of these messages and identifiers are possible within the scope of the invention. For example, it is not necessary for the first and second cable identifiers X, Y to include respective endpoint labels, e.g. Endpoint 1 and Endpoint 2, for cables having only two endpoints. It would be sufficient for these cable identifiers X, Y to include only a unique cable label, e.g. Cable 1234. In this case the cable endpoint Identifier 40 of the near-end message 22 would only contain the unique cable label, e.g. Cable 1234; however the remainder of the near-end message 22 would be the same. In this case, the far-end system, node B, would receive the near-end message 22, extract the information contained therein and determine that Cable 1234 is connected to port 1 of Node A and to port 2 of Node B in the same manner as described previously with respect to the first embodiment. Therefore, while it may be desirable to determine which specific cable endpoint of a given two-ended cable is connected to which I/O port of a system, such a determination is not necessary for ascertaining that endpoints of the given cable are connected to respective I/O ports of the systems, thereby providing connectivity between the systems.

A further variation of the foregoing messages 22, 24, 26 should be noted for cases in which it is possible to uniquely identify an I/O port by a single identifier such that both a system identifier (e.g. near-end and far-end system identifiers 42, 52) and an I/O port identifier (e.g. near-end and far-end system I/O port identifiers 44, 54) are not required. For example, in cases where an I/O port is assigned a unique Internet Protocol (IP) or Media Access Control (MAC) address. In such cases the near-end and far-end system identifiers 42, 52 could be omitted from the messages 22, 24, 26 and the near-end or far-end system I/O port identifiers 44, 54, as applicable to the message in question, could simply be the IP or MAC address of the given I/O port.

Figure 3:
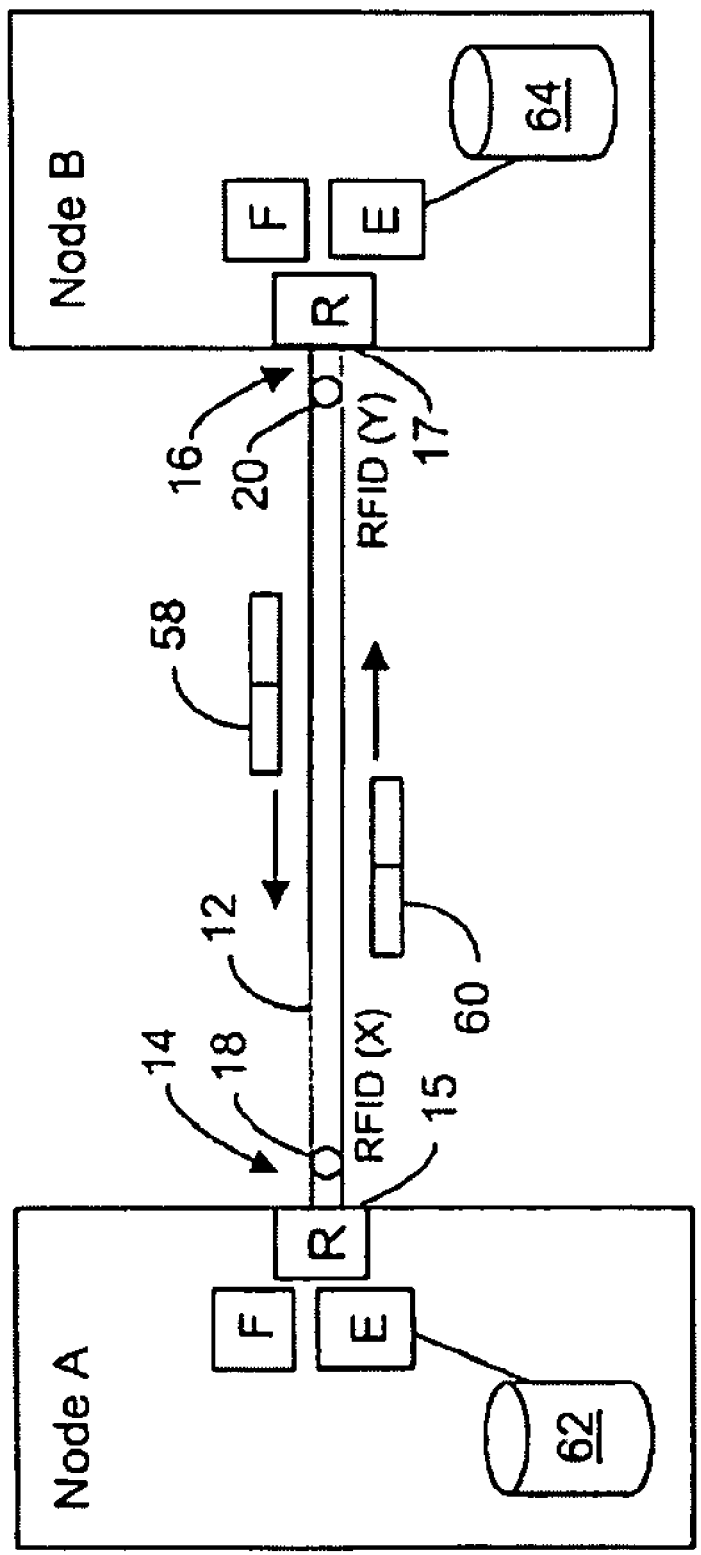
FIG. 3 illustrates a second embodiment of the invention.

Referring to FIG. 3, according to a second embodiment of the invention, the far-end system, node B, includes a form after F and RFID reader R as in the near-end system to enable the second cable identifier Y to be read and a far-end message 58 similar to that of the near-end message 22 to be created and sent to the near-end system. This functionality would allow cable endpoint connectivity to be ascertained from either the near-end or far-end system, for example by a craft person working locally at either one of those systems. Furthermore, such functionality would enable either system to behave as a far-end system in which a cable endpoint identifier can be read from an RFID tag, automatically appended to a connectivity query message 60 from a near-end system and looped back around to that system for remote endpoint identification. An alternative would be simply to respond to such a connection query message 60 from a far-end system with a near-end message 22. In either case, such functionality would be useful for a system, such a SONET/SDH or Ethernet system, or the like so that the remote endpoint attachment could be positively identified. This second embodiment includes an extractor E in the near-end system as was included in the far-end system of the first embodiment.

In the second embodiment the near-end and far-end systems include respective repositories 62, 64 for storing cabling endpoint connectivity information such as that contained in the near-end and far-end messages 22, 58 and the near-end and far-end update messages 24, 26. This information could be accessed directly from one of the systems by a craft person, for example via a system console or craft interface, or it could be accessed by an OSS 30 or network management system.

The structure and operation of two embodiments of the invention have been described as well as several modifications, variations and adaptations that can be made to them. In addition, it should be noted that one or both of the formatter F and extractor E of the near-end and far-end systems, as the case may be, could be implemented in hardware, software or some combination thereof. Furthermore, in some embodiments of the invention it may be difficult to isolate the formatter F and extractor E from other elements of the near-end and far-end systems, or subsystems. Nevertheless, it is the functionality of the formatter F and extractor E that enable the near-end and far-end systems of those embodiments to operate as intended. Therefore, the near-end and far-end systems, or subsystems, of the various described embodiments and variations should be operable to provide the functions of the formatter F and extractor E as described with respect those embodiments and variations.

It should now be apparent that the described embodiments and variations provide an advantage over the art in that they not only enable positive confirmation of the communicative connection between the ports of two systems or subsystems but also identification of the cable providing the connection. Through the use of RFID tags embedded or affixed to the cable and one or one more RFID readers installed or portably located at an endpoint of the cable connected to one of the systems or subsystems, such identification can be performed in a cost-effective and reliable manner. By carrying the identification information over the cable itself between the ports so connected, confirmation of the communicative connection can be made in a periodic, automatic, or manually initiated manner as previously described.

What is claimed is:

1. An apparatus for determining endpoint connectivity of a communications cable, comprising:
a near-end system operable to receive a cable identifier of the communications cable and to create and send a near-end message to a far-end system over the cable, the cable identifier including a unique cable label for the communications cable, and the near-end message containing information including the unique cable label and a unique input/output (I/O) port identifier for a first I/O port of the near-end system to which the communications cable is connected; and
a far-end system operable to read the information contained in the near-end message when it is received at a second I/O port of the far-end system, the second I/O port connected to the communications cable, and, using the information, to associate the first and second I/O ports with the unique cable label, thereby determining endpoint connectivity of the communications cable.

2. The apparatus of claim 1, further comprising a radio frequency identify (RFID) reader for reading the cable identifier stored in an RFID tag disposed at an end of the communications cable connected to the first I/O port.

3. The apparatus of claim 2, wherein the RFID reader is part of the near-end system.

4. The apparatus of claim 2, wherein the RFID reader is portable and is communicatively coupled to the near-end system.

5. The apparatus of claim 2, wherein the cable identifier further includes an endpoint label that uniquely identifies the end of the communications cable connected to the first I/O port; and the near-end system is further operable to include the endpoint label in the information of the near-end message.

6. The apparatus of claim 2, wherein the near-end system is further operable to include a near-end system identifier in the information of the near-end message.

7. The apparatus of claim 2, wherein the far-end system is further operable to create and send a far-end update message to a management entity, the far-end update message includes the information of the near-end message and a unique I/O port identifier for the second I/O port.

8. The apparatus of claim 7, wherein the far-end update message further includes additional information comprising one or more of time-of-day, date, and location of the far-end system.

9. The apparatus of claim 7, wherein the near-end system is further operable to send a near-end update message to the management entity, the near-end update message includes the information of the near-end message.

10. The apparatus of claim 9, wherein the near-end update message includes additional information comprising one or more of time-of-day, date, and location of the near-end system.

11. The apparatus of claim 2, wherein:
the far-end system is further operable to send a connection query message to the near end system; and the near-end system is further operable to receive the connection query message and to respond thereto by creating and sending the near-end message to the far-end system.

12. The apparatus of claim 11, further comprising another RFID reader for reading another cable identifier stored in an RFID tag disposed at another end of the communications cable, the another end connected to the second I/O port; wherein the far-end system is further operable to include a unique I/O port identifier for the second I/O port in the far-end update message.

13. The apparatus of claim 12, wherein the RFID reader is part of the far-end system.

14. The apparatus of claim 12, wherein the RFID reader is portable and is communicatively coupled to the far-end system.

15. The apparatus of claim 12, wherein:
the far-end system is further operable to create and send a far-end message to the near-end system, the far-end message including the unique cable label and the unique I/O port identifier for the second I/O port; and
the near-end system is further operable to read the far-end message which is received at the first I/O port and, using information included in that message, to associate the first and second I/O ports with the unique cable label, thereby determining endpoint connectivity of the communications cable interconnecting the two systems.

16. The apparatus of claim 15, wherein:
the another cable identifier further includes another endpoint label that uniquely identifies the end of the communications cable connected to the second I/O port; and
the far-end system is further operable to include said another endpoint label in the far-end message.

17. The apparatus of claim 16, wherein the far-end system is further operable to include a far-end system identifier in the far-end message.

18. The apparatus of claim 1, wherein the near-end system further comprises a near-end repository and is operable to store the information contained in the near-end message therein.

19. The apparatus of claim 7, wherein the far-end system further comprises a far-end repository and is operable to store information contained in the far-end update message therein.

20. A system operable to receive a cable identifier of a communications cable and to create a near-end message for transmission to a far-end system over the cable, the cable identifier including a unique cable label for the communications cable, and the near-end message containing information including the unique cable label and a unique I/O port identifier for an I/O port of the near-end system to which the communications cable is connected.

21. The system of claim 20, further comprising an RFID reader for reading the cable identifier which is stored in an RFID tag disposed at an end of the communications cable connected to the I/O port.

22. A method of determining endpoint connectivity of a communications cable interconnecting a near-end system and a far-end system via a first input/output (I/O) port of the near-end system and a second I/O port of the far-end system, the method comprising the steps of:
creating a near-end message containing information that includes a cable identifier and a first I/O port identifier for the first I/O port, the cable identifier including a unique cable label for the communications cable;
sending, from the first I/O port, the near-end message to the far-end system over the communications cable;
receiving the near-end message at the second I/O port; and
associating a second I/O port identifier for the second I/O port with the first I/O port identifier and the unique cable label, thereby determining endpoint connectivity of the communications cable interconnecting the near-end and far-end systems.

23. The method of claim 22, further comprising the step of reading the unique cable label from an RFID tag disposed at a first end of the communications cable connected to the first I/O port.

24. The method of claim 23, wherein:
the step of reading further comprises reading a first endpoint label uniquely identifying the first end of the communications cable connected to the first I/O port; and
the step of creating further comprises including the first endpoint label in the information of the near-end message.

25. The method of claim 23, wherein the step of creating further comprises including a near-end system identifier in the information of the near-end message.

26. The method of claim 23, further comprising the steps of:
creating a far-end update message that includes the information of the near-end message and the second I/O port identifier; and
sending the far-end update message to a management entity.

27. The method of claim 26, wherein the far-end update message further includes additional information comprising one or more of time-of-day, date, and location of the far-end system.

28. The method of claim 23, further comprising the step of writing a record into a repository, the record including the second I/O port identifier, the first I/O port identifier, and the unique cable label.

29. A method of determining endpoint connectivity of a communications cable interconnecting a near-end system and a far-end system via a first input/output (I/O) port of the near-end system and a second I/O port of the far-end system, the method comprising the steps of:
sending, from the second I/O port, a connection query message to the near-end system over the communications cable;
receiving the connection query message at the first I/O port;
creating a near-end message containing a cable identifier and a first I/O port identifier for the first I/O port, the cable identifier including a unique cable label for the communications cable;
sending, from the first I/O port, the near-end message to the far-end system over the communications cable;
receiving the near-end message at the second I/O port; and
associating a second I/O port identifier for the second I/O port with the first I/O port identifier and the unique cable label, thereby determining endpoint connectivity of the communications cable interconnecting the near-end and far-end systems.

* * * * *